(12) United States Patent
Malloy et al.

(10) Patent No.: US 7,729,256 B2
(45) Date of Patent: Jun. 1, 2010

(54) CORRELATING PACKETS

(75) Inventors: Patrick J. Malloy, Washington, DC (US); Michael Cohen, Chicago, IL (US); Alain J. Cohen, Washington, DC (US)

(73) Assignee: OPNET Technologies, Inc., Bethesda, MD (US)

( * ) Notice: Subject to any disclaimer, the term of this patent is extended or adjusted under 35 U.S.C. 154(b) by 1200 days.

(21) Appl. No.: 11/180,879

(22) Filed: Jul. 13, 2005

(65) Prior Publication Data

US 2006/0050704 A1 Mar. 9, 2006

Related U.S. Application Data

(60) Provisional application No. 60/588,010, filed on Jul. 14, 2004.

(51) Int. Cl.
  *G01R 31/08* (2006.01)
  *G06F 15/173* (2006.01)
(52) U.S. Cl. ........................ 370/235; 709/224
(58) Field of Classification Search ........................ None
  See application file for complete search history.

(56) References Cited

U.S. PATENT DOCUMENTS

| | | | | |
|---|---|---|---|---|
| 6,129,050 | A * | 10/2000 | Carbajal | 119/165 |
| 7,047,297 | B2 * | 5/2006 | Huntington et al. | 709/224 |
| 7,246,101 | B2 * | 7/2007 | Fu et al. | 706/46 |
| 2002/0166063 | A1 * | 11/2002 | Lachman et al. | 713/200 |
| 2003/0097439 | A1 * | 5/2003 | Strayer et al. | 709/224 |
| 2003/0097595 | A1 * | 5/2003 | Partridge et al. | 713/201 |
| 2004/0073655 | A1 * | 4/2004 | Kan et al. | 709/224 |
| 2004/0123155 | A1 * | 6/2004 | Etoh et al. | 713/201 |
| 2004/0186724 | A1 * | 9/2004 | Morin | 704/273 |
| 2005/0030979 | A1 | 2/2005 | Malloy | |
| 2005/0198268 | A1 * | 9/2005 | Chandra | 709/224 |

OTHER PUBLICATIONS

Batzoglou, S., CS262, lectures two and three, Stanford University, winter, 2004.
"Sequence Alignment", en.wikipedia.org/wiki/sequence_alignment.
Allison, L., "Hirschberg's Algorithm", www.csse.monash.edu.au/~lloyd, 1999, School of Computer Science and Software Engineering, Faculty of Information Technology, Monash University, Australia.
Myers, E. and Miller, W., "Optimal Alignments in Linear Space", CABIOS, vol. 4, pp. 11-17, 1988.
Needleman-Wunsch Algorithm, en.wikipedia.org/wiki/Needleman-Wunsch_algorithm.
U.S. Appl. No. 11/180,878, filed Jul. 13, 2005, Malloy et al.

* cited by examiner

*Primary Examiner*—Hong Cho
*Assistant Examiner*—Eunsook Choi
(74) *Attorney, Agent, or Firm*—Robert M. McDermott, Esq.

(57) ABSTRACT

A system/method searches a traffic stream for a sequence of "matching" packets that exhibit a high degree of correlation or similarity to a sequence of "reference" packets. The correlation between matching and reference packets is based on a degree of correspondence between individual packets, as well as the sequence-order of the corresponding packets. A variation of the Needleman-Wunsch algorithm is preferably used to select corresponding packets in the traffic stream that provide a sequence-order that best matches the sequence-order of the reference packets, based on a measure of the correspondence for each match, and a penalty associated with each non-match. The algorithm is further modified to reduce the required search-space for finding corresponding packets in the traffic stream.

52 Claims, 4 Drawing Sheets

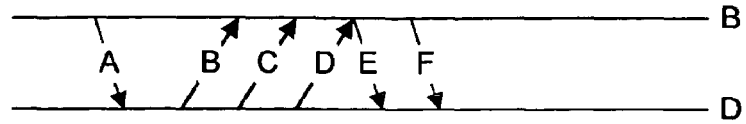
FIG. 2A
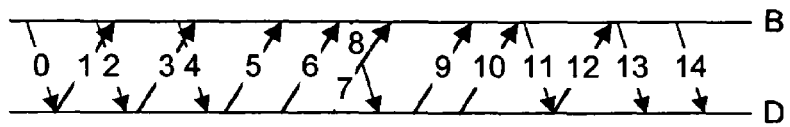
FIG. 2B
|   | 0 | 1 | 2 | 3 | 4 | 5 | 6 | 7 | 8 | 9 | 10 | 11 | 12 | 13 | 14 |
|---|---|---|---|---|---|---|---|---|---|---|----|----|----|----|----|
| A | 60 | -99 | 90 | -99 | 70 | -99 | -99 | -99 | 95 | -99 | -99 | 95 | -99 | 85 | 90 |
| B | -99 | 30 | -99 | 40 | -99 | 80 | 80 | 40 | -99 | 80 | 10 | -99 | 80 | -99 | -99 |
| C | -99 | 35 | -99 | 60 | -99 | 80 | 90 | 20 | -99 | 80 | 20 | -99 | 60 | -99 | -99 |
| D | -99 | 30 | -99 | 80 | -99 | 60 | 60 | 30 | -99 | 90 | 10 | -99 | 60 | -99 | -99 |
| E | 80 | -99 | 80 | -99 | 95 | -99 | -99 | -99 | 60 | -99 | -99 | 90 | -99 | 80 | 80 |
| F | 70 | -99 | 90 | -99 | 80 | -99 | -99 | -99 | 70 | -99 | -99 | 85 | -99 | 90 | 70 |
FIG. 2C
|   | 0 | 1 | 2 | 3 | 4 | 5 | 6 | 7 | 8 | 9 | 10 | 11 | 12 | 13 | 14 |
|---|---|---|---|---|---|---|---|---|---|---|----|----|----|----|----|
| A | 60 | 60 | 90 | 90 | 90 | 90 | 90 | 90 | 95 | 95 | 95 | 95 | 95 | 95 | 95 |
| B | 10 | 90 | 90 | 130 | 130 | 170 | 170 | 170 | 170 | 170 | 170 | 170 | 170 | 170 | 170 |
| C | -40 | 45 | 45 | 150 | 150 | 210 | 260 | 260 | 260 | 260 | 260 | 260 | 260 | 260 | 260 |
| D | -90 | -5 | -5 | 125 | 125 | 210 | 270 | 290 | 290 | 350 | 350 | 350 | 350 | 350 | 350 |
| E | -120 | -55 | 75 | 75 | 215 | 215 | 220 | 240 | 350 | 350 | 350 | 440 | 440 | 440 | 440 |
| F | -170 | -105 | 35 | 35 | 190 | 190 | 190 | 190 | 310 | 310 | 310 | 435 | 435 | 530 | 530 |
FIG. 2D
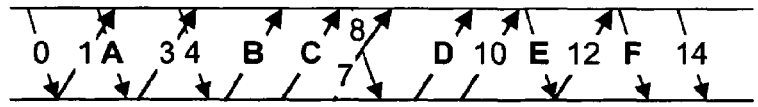
FIG. 2E

CORRELATING PACKETS

This application claims the benefit of U.S. Provisional Patent Application 60/588,010, filed 14 Jul. 2004.

BACKGROUND AND SUMMARY OF THE INVENTION

This invention relates to the field of communication systems, and in particular to techniques for locating similar streams of packets in different communication channels.

The tracing of a message through a typical network is a difficult task, particularly when the message is partitioned into discrete smaller units, or packets, that are communicated independently, amongst thousands of other packets of other messages. The difficulty of this task is further compounded if the exact content of the message, or the exact content of each packet, is unknown. For ease of reference, the term packet is used herein in the general sense, to identify a transmission that is a subset of a series of transmissions, although the invention is not limited to packet-based protocols.

The complexity of the tracing task can be reduced by appropriately filtering the packets, using, for example, the identification of the source and/or destination node within the header of each packet, the time associated with each packet, and so on. In like manner, event-sequencing may be used to filter packets, wherein, for example, if the message is known to be in response to a request, messages originating before the time that the request is received can be ignored. However, even with such filtering techniques, the packets corresponding to the message to be traced are often intermixed among dozens or hundreds of packets of other messages.

In many trace scenarios, other characteristics of the target transaction are known, or able to be estimated, and the tracing task involves finding a sequence of packets that exhibit similar characteristics. In some instances, for example, the target message may be known to contain certain words or phrases, or may be known to consist of a certain sequence of identifiable packets, the packets being identifiable by particular content, by a size of the packet, and so on. These characteristics of the target message can be used to form a "reference" message, comprising a sequence of reference packets, and the trace task can be recast as the task of finding a sequence of packets within a traffic stream that best matches the sequence of reference packets.

It is an object of this invention to provide a system and method for finding a sequence of packets within a traffic stream that best matches a sequence of reference packets. It is a further object of this invention to provide this method and system for finding a matching sequence of packets based on characteristics associated with a target message. It is a further object of this invention to provide this method and system for finding a matching sequence of packets when an exact match between individual packets is not available.

These objects, and others, are achieved by a system and method that searches a traffic stream for a sequence of "matching" packets that exhibit a high degree of correlation or similarity to a sequence of "reference" packets. The correlation between matching and reference packets is based on a degree of correspondence between individual packets, as well as the sequence-order of the corresponding packets. A variation of the Needleman-Wunsch algorithm is preferably used to select corresponding packets in the traffic stream that provide a sequence-order that best matches the sequence-order of the reference packets, and the algorithm is further modified to reduce the required search-space for finding corresponding packets in the traffic stream.

BRIEF DESCRIPTION OF THE DRAWINGS

The invention is explained in further detail, and by way of example, with reference to the accompanying drawings wherein:

FIGS. 2A-2E illustrate an example process of finding matching packets within a set of traffic packets in accordance with this invention.

The drawings are included for illustrative purposes and are not intended to limit the scope of the invention.

DETAILED DESCRIPTION OF THE INVENTION

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

The invention is presented herein using the paradigm of searching among packets for a set of matching packets that correspond to a set of reference packets. One of ordinary skill in the art will recognize that other applications/tasks may also benefit from the principles of this invention, and may include, for example, finding a set of matching packets having a given set of characteristics, tracing packets of a message as the message is routed across links, and so on. Also, as noted above, the term packet is used herein for ease of presentation and understanding, and the scope of this invention is not limited to a packet-based protocol. One of ordinary skill in the art will recognize that the techniques disclosed herein can be applied to identify particular streams of data, particular sequences of bytes, and so on, and can be applied to connection-oriented protocols as well as packet-oriented protocols, and others. In like manner, although the invention is presented in the context of transmissions on a network, one of ordinary skill in the art will recognize that the form or structure of the means of communication between or among nodes is irrelevant to this invention. For example, the application of the techniques of this invention may range from tracing communications in a point-to-point system, such as along a trace between chips on a PC-board, to tracing messages communicated via a wide-area network, such as a telephone system or the Internet.

Figure 1A:
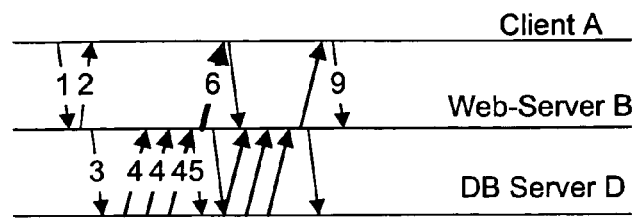
FIGS. 1A-1D illustrate example reference and production traffic flow diagrams.

FIG. 1A illustrates an example reference transaction, comprising a sequence of transmissions among nodes A, B, D, in a network. This example serves to illustrate a typical database access transaction, wherein a client A sends a request for data to a server B, and the server B provides the data by accessing a database server D. Note that although a single node is identified at each tier of the transaction, each of the example nodes A, B, and D could be representative of multiple nodes. For example, the database server D may include multiple servers D1, D2, D3, etc. that are configured to load-balance requests for data from a common database.

In this example, client A initiates the transaction via a request 1 to Web-server B. Server B sends an acknowledgment 2 to client A, and sends a database access request 3 to the database server D. In response to this request 3, the database server D sends data 4 to the server B. In this example, server B buffers/collects multiple transmissions 4 from server D, and provides a consolidated transmission 6 to client A; server B also sends a pause-request 5 to server D to allow it time to form the transmission 6 for client A. Such sequences of transmissions continue until client A sends a receipt-acknowledgement 9, terminating the transaction.

Note that the transaction illustrated in FIG. 1A can serve as a 'template' that represents a typical data-transfer transaction between client A and server B, via database server D. This template can be 'sized' to provide a reference set of exchanges between the nodes A, B, D for different types of data requests, or can be customized to provide a reference set of exchanges for a request for specific data from server D. Such a reference set of transmissions among nodes corresponding to a given transaction or transaction-type can be used, for example, to evaluate the performance of the nodes, or the network that connects the nodes, when the nodes are operated in a 'production' environment, wherein the transaction is one of many transactions that the nodes and the network are concurrently processing.

Copending U.S. patent application Ser. No. 11/180,878, "PACKET TRACING", filed 13 Jul. 2005 for Patrick J. Malloy et al., and incorporated by reference herein, teaches the capture of a reference set of transmissions corresponding to a given transaction, by executing the transaction in a controlled environment, or in a production environment during periods of low activity. Transmissions unrelated to the transaction, if any, are removed from the collected set, and this reference set is subsequently used to identify a similar set of transmissions in a production environment, via a series of filters, based on the order of transmission, content-matching, and so on.

Figure 1B:
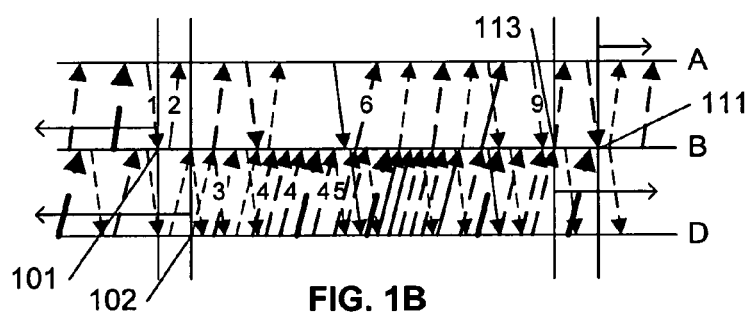

FIG. 1B illustrates the occurrence of a transaction corresponding to the reference transaction of FIG. 1A in a production environment that contains transmissions (dashed arrows) of other transactions. The transmissions corresponding to the subject/target transaction are identified among the other transmissions by the reference numerals used in FIG. 1A.

In the example of FIG. 1A, the transaction is initiated by a transmission 1 from node A to node B. In the example of FIG. 1B, transmissions that occur prior to a transmission from node A to node B can be eliminated from consideration, as illustrated by the arrow to the left of time 101, at which a transmission is received at B from A. In like manner, transmissions between B and D that occur prior to a transmission from B to D after the transmission from A to B can be eliminated from consideration, as indicated by the arrow to the left of time 102. Similar rules can be applied to eliminate trailing transmissions after times 112 and 111, as detailed in the above referenced "PACKET TRACING" application.

Figure 1C:
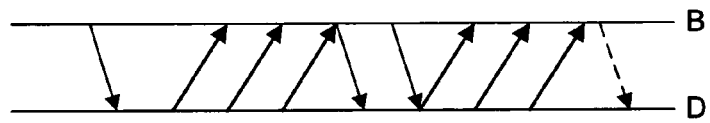
Figure 1D:

FIG. 1C illustrates the set of reference transmissions between nodes B and D for the reference transaction, and FIG. 1D illustrates the set of transmissions between nodes B and D that includes the transmissions corresponding to the transaction in the production environment, after filtering the transmissions based on order-of-occurrence and/or other filters that can serve to eliminate production traffic transmissions from consideration. Note that although this invention is particularly well suited for comparing actual reference transmissions to a set of collected transmissions, as suggested in the above referenced "PACKET TRACING" application, the reference transmission need not be actual transmissions, but rather, a description of the expected transmissions that serve as reference transmissions for comparison with the collected traffic. In like manner, the collected transmissions need not be the actual transmissions, but may be a characterization of the actual transmissions as provided, for example, by a network "sniffer" device. That is, for the purposes of this disclosure, the term "transmission" includes a description of one or more characteristics of a communication between or among nodes. Such a description may be as simple as the description illustrated in FIGS. 1A-1D (a set of arrows between nodes), but will typically also include additional characteristics that facilitate a comparison between the transmissions, such as a size of the transmission, and any relevant "header" information.

In FIG. 1D, the transmissions corresponding to the transaction of interest are illustrated as solid arrows, and the transmissions that are unrelated to the transaction are illustrated as dashed arrows. In the production environment, such a convenient solid-dashed distinction is not available, and the objective of this invention is to identify the transmissions corresponding to the transaction of interest (the solid arrows) from the other transmissions (the dashed arrows).

FIGS. 2A and 2B illustrate a shorter subset of transmissions than those illustrated in FIGS. 1C and 1D, for ease of presentation and understanding. For ease of reference, the term packet is used hereinafter to identify each transmission, and the term "traffic" is used hereinafter to refer to a sequence of transmissions, such as illustrated in FIG. 2B that is assumed to contain packets that correspond to a set of reference packets, such as illustrated in FIG. 2A. Generally, this traffic is obtained from a "production" environment, to assess the ability of the environment to handle the transaction of interest, although the principles of this invention are not constrained to a particular source of traffic patterns. In this example, the reference packets are labeled A through F, and the traffic packets are labeled 0 through 14. The objective of this invention is to identify which of the traffic packets 0-14 are most likely to correspond to the reference packets A-F.

In a preferred embodiment of this invention, each reference packet A-F is compared to each traffic packet 0-14, and a correspondence factor is determined. This correspondence factor is generally a measure of correlation or similarity between the packets, and can be based on a variety of parameters, depending upon the relevant characteristics of the reference packets A-F. A fundamental characteristic of each packet, for example, is its 'direction', in this example, the direction of the arrows, from node B to node D or from node D to node B, as well as other characteristics that are typically included in a 'header' segment of each packet, such as a virtual circuit identifier, and so on. Other comparable characteristics will be evident to those skilled in the art. For example, if the transaction is characterized by packets of varying sizes, such as small packets corresponding to requests from node B to node D, large packets corresponding to supplied data from node D to node B, small packets corresponding to acknowledgements, and so on, each of the packets A-F may be characterized by size, and the correspondence can be further based on the size of each traffic packet 0-14 compared to the size of each of the packets A-F. In like manner, the packets may be characterized by data content, such as the occurrence of key words or phrases in the packets, sequences of data items in the packet, and so on, as discussed further below.

FIG. 2C illustrates an array of the correspondence factor between each of the reference packets A-F and each of the traffic packets 0-14. In this example, packet A has a correspondence or similarity score of "60" relative to packet 0, and a score of "–99" to packet 1. As noted above, the direction of each packet is typically highly indicative of correlation or lack of correlation, and in this example, all packets of opposing direction are assigned a correspondence factor of –99. That is, because packet A is from B to D, whereas packet 1 is from D to B, the correspondence between packets A and 1 is "–99". Packets 0 and 2 travel in the same direction as packet A, however, as indicated by the score of "60" for packet 0 and the score of "90" for packet 2, packet A is apparently more similar to packet 2 than to packet 0. As noted above, this difference in correspondence factor could be attributed to a difference in sizes between packet A and the packets 0 and 2, or the difference in content material in the packets, or the difference of other characteristics associated with the reference packet A, including, for example, a measure of the time between the receipt of the packet A/0/2 at node D and the corresponding response B/1/3/5 from the node D. As would be evident to one of ordinary skill in the art, any and all of the differences between the reference packet A and the traffic packets 0/2/4/8/11/13/14 can be used to provide, and/or influence the determination of, the correspondence factor between packet A and each of the traffic packets 0, 2, 4, etc.

With a correspondence factor between each reference packet A-F and each traffic packet 0-14, the task becomes finding an assignment of each reference packet A-F to a corresponding traffic packet 0-14 that provides the highest combined correspondence factor. Preferably, however, the assignment of reference packets to traffic packets preserves the sequential order of the reference packets, and thus the task is not merely to select the traffic packet having the highest correspondence score for each reference packet. That is, for example, packet A is illustrated in FIG. 2C as being most highly correlated to packet 11, and packet E is most highly correlated to packet 4. Matching packet A to packet 11 and packet E to packet 4, however, would indicate that in the environment that produced the traffic packets 0-14, packet E(4) arrived at node D before packet A(11) arrived at node D, which is inconsistent with the reference template of FIG. 2A, which indicates that packet A from node B initiates the transfer of packets B, C, and D from node D, followed by the packet E from node B. Thus, the task is to find an assignment of each reference packet A-F to a corresponding traffic packet 0-14 that provides the highest combined correspondence factor while preserving the order of the reference packets A-F in the corresponding set of traffic packets.

In a preferred embodiment, a sum of the correlation correspondence factors is used to define the combined correspondence factor, although other combinations, including weighted sums or averages may also be used. That is, for example, if packet A is matched to packet 0, and packet B is matched to packet 1, the cumulative correspondence factor for this assignment (A-0, B-1) is 90 (from FIG. 2B: A-0 correspondence factor (cf)=60; B-1 cf=30). If packet C is then matched to packet 3 (C-3 cf=60), the cumulative correspondence factor for this assignment (A-0, B-1, C-3) becomes 150 (60+30+60). Alternatively, if packet A is matched to packet 2, packet B to packet 3, and packet C to packet 5, the cumulative correspondence factor for this assignment (A-2, B-3, C-5) is 210 (90+40+80). However, if packet B is matched to packet 5, and packet C to packet 6 (A-2, B-5, C-6), an even higher cumulative score of 260 can be achieved (90+80+90).

If all of the possible properly ordered assignments of matches between each of the reference packets A-F and each of the traffic packets 0-14 are evaluated, the assignment that provides the highest cumulative score can be selected as the most likely correlation between the packets A-F and the traffic packets 0-14. In the above example, if it is assumed that the order of the matched packets must be maintained, it can be shown that an assignment of (A-2, B-5, C-6, D-9, E-11, F-13) provides a cumulative correspondence factor of 530, which is the highest correspondence factor of all of the other possible properly ordered assignments. This set of matching traffic packets is illustrated in FIG. 2E. (FIG. 2D is described separately, below.)

In summary, the determination of a correspondence between a set of reference packets and a set of traffic packets includes identifying a correspondence factor between each traffic packet of a plurality of traffic packets and each reference packet of the plurality of reference packets, selecting a set of matching packets from the plurality of packets, based on the correspondence factor between each packet, and based on a sequence order of the plurality of reference packets.

Although the selection of the best-matched set of traffic packets corresponding to the reference packets assumes the determination of a correspondence factor between each traffic packet and each reference packet, one of ordinary skill in the art will recognize that an exhaustive comparison need not always be performed. For example, in the example above, the reference packet A need not be compared to all of the traffic packets 0-14. As noted above, all of the packets 1, 3, 5, 6, 7, 9, 10, and 12 that do not originate at node B need not be considered (and hence are scored –99); thus, a "comparison" of packet A to these packets can be terminated as soon as the source-node is recognized as not being node B. Additionally, if it is known that at least five packets (B-F) must be communicated after the packet A, the correspondence between packet A and each of the packets 11, 13, and 14 may not be required and/or warranted. That is, for example, if an assignment matches packet A to packet 14, the correspondence of each of the packets B-F to subsequent packets in the traffic stream becomes irrelevant, because there are no other subsequent packets in the traffic stream. Without corresponding traffic packets to packets B-F, the total correspondence factor is likely to be extremely low, and thus comparing packet A to packet 14 is not likely to affect the outcome of the matching/evaluating process. In like manner, if packet A is associated with packets 11 or 13, at most three of the remaining five packets B-F can be matched to corresponding traffic packets, and the total correlation is also likely to be low. In like manner, comparing the last reference packet F to the initial packets 0-2 may also be avoided. One of ordinary skill in the art will recognize that a variety of rules can be devised to avoid having to compare every reference packet to every traffic packet, particularly with regard to leading and trailing packets.

It is noted that the matching of reference packets to traffic packets need not be one-to-one. That is, there may be "missing" packets in the collected traffic, and attempting to match each and every reference packet to a traffic packet may lead to a sub-optimal result. Such missing packets can occur for a variety of reasons, such as the routing of a packet from D to B via an alternative route that causes it to be filtered from the collected traffic, or the genuine absence of the packet during the target transaction. That is, for example, the template of FIG. 2A illustrates three packets B, C, D being sent from D to B before a response E is sent from B to D. This response E may be a "buffer-full" message that node B typically sends after receiving three packets from node D; in some instances, due to other traffic flow, node B may send such a buffer-full message after receiving only two packets B, C from node D, and packet D is sent during a subsequent transmission. Or, in another example, it may typically take three packets B, C, D from node D to satisfy a request A from node B, but in some instances, only two packets B, C may be required. In a preferred embodiment, the set of possible assignments of reference packets to matching traffic packets allows for null-matches, with a penalty being included in the cumulative correspondence factor for each null-match. For example, if a penalty of −50 is allocated for a null-match, then the assignment of packet A to packet 0 and an assignment of packet C to packet 1 forces a null-match to packet B, and the cumulative correspondence factor for this assignment (A-0, B-null, C-1) will be 45 (A-0 cf=60; B-null cf=−50; C-1 cf=35).

In like manner, an assignment that provides a "tight" set of matches within the traffic packets may be preferred to an assignment that spreads the matches over a span of many traffic packets. In such a scenario, a penalty may be allocated for every traffic packet between the first match and the last match that is not matched to a reference packet. Generally, such a penalty would be less than the penalty associated with a reference packet not being matched to a traffic packet, because intervening traffic packets are expected to occur more often than missing traffic packets. For example, a penalty of −10 may be allocated for each intervening non-matched traffic packet, and the above referenced assignment of (A-2, B-3, C-5) would have an accumulated correspondence factor of 200 (A-2 cf=90; B-3 cf=40; null-4 penalty=−10; C-5 cf=80). Optionally, the penalty can also be allocated for the initial non-matched traffic packets 0 and 1, reducing the cumulative factor to 180, but generally an offset to the start or end of the set of matched packets within the collected traffic is not penalized.

An exhaustive determination of each possible assignment of reference packets to traffic packets, including null-assignments, is computationally intensive. Any of a variety of techniques, common in the art of dynamic programming, can be used to facilitate the determination of the set of matching traffic packets that provide the highest cumulative correspondence factor without such an exhaustive determination of each possible assignment. A variation of the Needleman-Wunsch algorithm has been found to be particularly well suited to this application.

The Needleman-Wunsch algorithm is commonly used for pattern matching, such as finding the best-matching alignments of protein or DNA sequences (Needleman, S. and Wunsch, C, "A general method applicable to the search for similarities in the amino acid sequences of two proteins", Journal of Molecular Biology, Vol. 48, pp. 443-453, 1970), and has been applied to tasks such as finding matching text strings within documents, and others.

Figures 3, 4A, 4B:
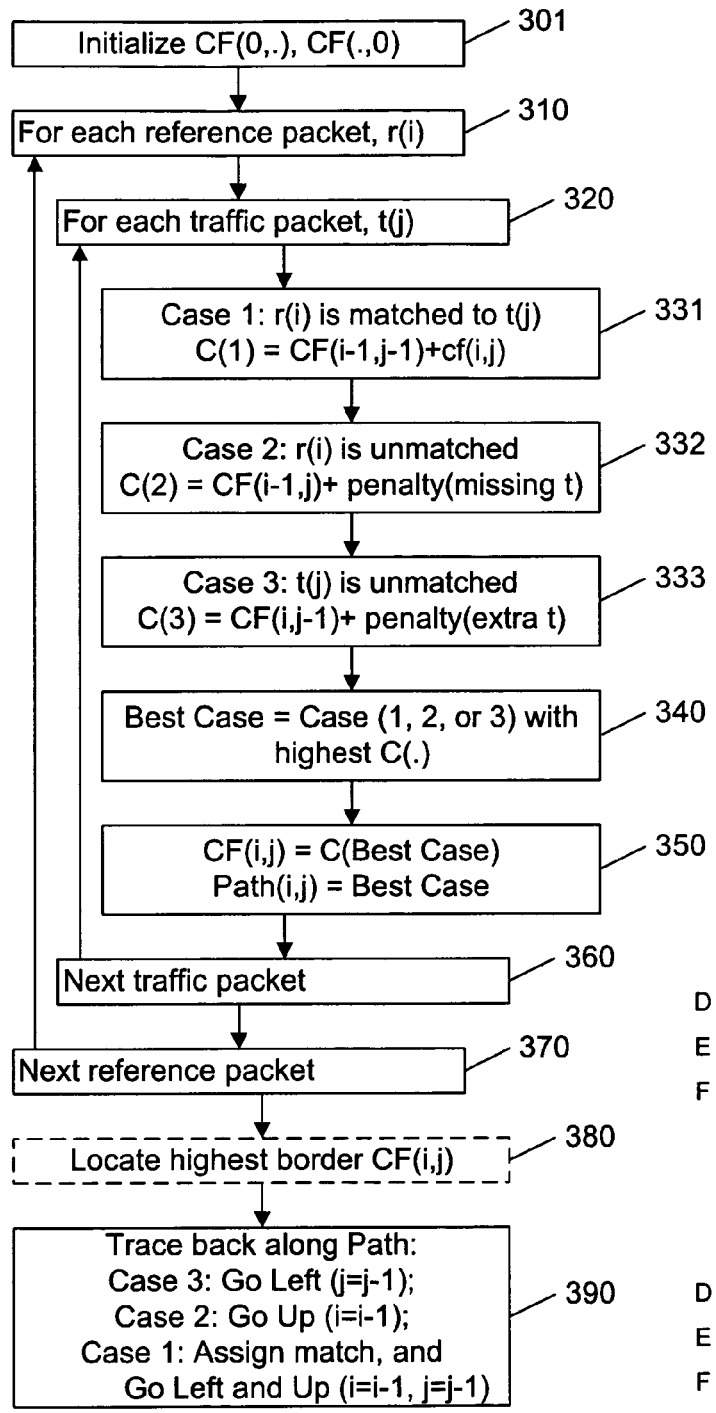
FIG. 3 illustrates an example flow diagram for finding matching packets within a set of traffic packets in accordance with this invention.
FIGS. 4A-4B illustrate a subset of a path array that facilitates backtracking to identify an optimal set of matching packets within a set of traffic packets in accordance with this invention.

FIG. 3 illustrates an example flow diagram, using a variation of the Needleman-Wunsch algorithm, for finding the best assignment of matching traffic packets to reference packets, based on a correspondence factor cf(i,j) between each reference packet r(i) and each traffic packet t(j). The algorithm is based on the observation that at a given point in the assignment process, there are only three possible choices:

1. declare a match between the reference packet r(i) and the traffic packet t(j);
2. declare a null-match to the reference packet r(i) (a missing traffic packet); and
3. declare a null-match to the traffic packet t(j) (an extra traffic packet).

Each of these choices will have an effect on the cumulative score thus far determined, and the optimal choice will be the choice that provides the highest cumulative score thus far.

FIG. 2D illustrates the operation of the flow diagram of FIG. 3 for producing a cumulative correspondence factor/score CF(i,j), based on the correspondence factors cf(i,j) illustrated in FIG. 2C. In FIG. 3, the "i" index corresponds to the rows of FIGS. 2C and 2D (the reference packets A-F), and the "j" index corresponds to the columns of FIGS. 2C and 2D (the traffic packets 0-14). In this example, a penalty of −50 is allocated for each non-match of a reference packet to a traffic packet ("missing" traffic packet, discussed above), and a penalty of 0 (i.e. no penalty) is allocated for each non-match of a traffic packet to a reference packet ("extra" traffic packet, discussed above).

At 301, the cumulative score CF is appropriately initialized, as discussed further below. In the general case, CF(i,0)= i*penalty (missing traffic packet), i=0 to R; CF(0,j)= j*penalty(extra traffic packet), j=0 to T, where R is the number of reference packets, and T is the number of traffic packets. Other initialization schemes may alternatively be used. For example, setting CF(0,j)=0, j=0 to T initializes the cumulative score array such that initial "extra" traffic packets are not assessed a penalty, corresponding to a simple offset to the start of the matching packets within the collected traffic.

The loops 310-370 and 320-360 step through each of the traffic packets t(j) for each of the reference packets r(i), to determine which of the above choices is optimal for each combination.

At 331, the first choice, case 1, is a match of reference packet r(i) to t(j). Such a match will correspond to an advancement from a prior state of (i−1, j−1); that is, if, for example, r(2) is matched to t(5), the prior assignment step would have been r(1) and t(4) being considered. Thus, the achievable cumulative score C(1) at (i,j) if case 1 is selected is CF(i−1, j−1)+cf(i,j).

At 332, the second choice, case 2, is a decision not to match the reference packet r(i) to any traffic packet, corresponding to the above discussed "missing traffic packet" case. Such a choice corresponds to an advancement from a prior state of (i−1,j); that is, for example, if r(2) and t(5) are being considered, and a choice is made to null-match r(2), the prior state must have been r(1) and t(5) being considered. Thus, the achievable cumulative score C(2) at (i,j) if case 2 is selected is CF(i−1,j)+penalty(missing traffic packet).

At 333, the third choice, case 3, is a decision not to match the traffic packet t(j) to any reference packet, corresponding to the above discussed "extra traffic packet" case. Such a choice corresponds to an advancement from a prior state of (i,j−1); that is, for example, if r(2) and t(5) are being considered, and a choice is made to null-match t(5), the prior state must have been r(2) and t(4) being considered. Thus, the achievable cumulative score C(3) at (i,j) if case 3 is selected is CF(i,j−1)+penalty(extra traffic packet).

At the first iteration, the first reference packet r(1), A is compared to the first traffic packet t(1), 0.

At 331, if reference packet A is matched to traffic packet 0, the correspondence factor cf(1,1) (A-0 in FIG. 2C) of 60 is added to the cumulative score thus far (CF(0,0)), which is initialized to 0 at 301. Thus, the cumulative score C(1) for this choice, case 1, is 60 (0+60).

At 332, if reference packet A is not matched to any traffic packet, a penalty of −50 is allocated, and the cumulative score C(2) for this choice, case 2, is −50. In like manner, at 333, if traffic packet 0 is not matched to any reference packet, a penalty of 0 is allocated, and the cumulative score C(3) for this choice, case 3, is −50, because CF(1,0) is initialize to −50 at 301. The interpretation of this case is that, at (1,1), if t(1), traffic packet 0, is not matched to a reference packet, r(1), reference packet A cannot be matched to a traffic packet, because at this point (1,1), traffic packet 0 is the only packet available for matching to reference packet A.

At 340, the best case is identified, in this instance, case 1. That is, at this point (1,1), the "best" choice that can be made is to assign a match of reference packet A to traffic packet 0. At 350, the cumulative score CF(1,1) is updated to reflect the cumulative score (60) achievable by this choice, and this best choice (case 1) is saved as Path(1,1).

The process loops back to 320, and the combination of the first reference packet r(1), A, and the second traffic packet t(2), 1, is assessed for each of the possible choices at 331-333. In this instance, a match between A and 1 has a correspondence factor of −99, and case 1 will result in a score C(1) of −99, CF(0,1) having been initialized to 0 at 301. Case 2, not matching r(1), packet A to any traffic packet, will again result in a score of −50, CF(0,2) having been initialize to 0 at 301. Case 3, not matching traffic packet t(2), traffic packet 1 to any reference packet will result in a score of 60, because the cumulative score CF(1,1) (CF(i,j−1), i=1, j=2) was determined to be 60 during the first iteration (see previous paragraph), and the penalty for a non-matched traffic packet is 0. Thus, at 340, the best case at (1,2) is determined to be case 3, and, at 350, CF(1,2) is updated to reflect the achievable score of 60, and Path(1,2) reflects case 3.

The process again loops back to 320, j is incremented to 3, and the three cases are again evaluated. In this instance, a match between r(1), A and t(3), 2 has a correspondence factor cf(1,3) of 90, and case 1 provides an achievable cumulative score C(1) of 90, CF(0,2) having been initialized to 0 at 301. Cases 2 and 3 provide cumulative scores C(2), C(3) of −50 and 60, respectively. Thus, at 340, the best case at (1,3) is determined to be case 1, and, at 350, CF(1,3) is updated to reflect the achievable score of 90, and Path(1,3) reflects case 1.

Each of the other traffic packets t(j) are similarly evaluated relative to r(1), packet A, and then the outer loop index, i, is incremented to reference r(2), packet B. The three possible choices at (2,1) are evaluated at 331-333. At 331, case 1 results in an achievable cumulative score C(1) of −99, because cf(2,1) is −99. At 332, case 2 results in an achievable cumulative score C(2) of 10, because CF(1,1) is 60, and the penalty associated with not matching packet B with any traffic packet (missing traffic) is −50. At 333, case 3 results in an achievable cumulative score of −100, because CF(2,0) is −100 (if traffic packet 0 is not allocated to any reference packet at this point (2,1), neither packet A nor packet B can be matched to a traffic packet, because traffic packet 0 is the only available packet at point (2,1). Thus, at 340, the best case at (2,1) is determined to be case 2, and, at 350, CF(2,1) is updated to reflect the achievable score of 10, and Path(2,1) reflects case 2.

At 320, the inner loop index, j, is incremented to 2, and the three possible choices at (2,2) are evaluated at 331-333. At 331, case 1 results in an achievable cumulative score C(1) of 90, because the correspondence factor between packet B and traffic 1, cf(2,2) is 30, and the prior computed cumulative score CF(1,1) is 60. At 332, case 2 results in an achievable score C(2) of 10 (CF(1,2)+penalty(missing t)=60−50), and at 333, case 3 also results in an achievable score of 10 (CF(2, 1)+penalty(extra t)=10+0). Thus, at 340, the best case at (2,2) is determined to be case 1, and, at 350, CF(2,2) is updated to reflect the achievable score of 90, and Path(2,2) reflects case 1.

At this point, it is worth noting the meaning of the result thus far: at (2,2), a cumulative score of 90 is achievable. The path at this point (Path (2,2)=case 1) indicates that this cumulative score is achievable by matching r(2) (reference packet B) with t(2) (traffic packet 1). This path also indicates that the prior cumulative score for achieving this score at (2,2) came from CF(1,1) (case 1 uses CF(i−1, j−1) to determine C(1)). Evaluating the path at (1,1) indicates that the cumulative score at (1,1) was also achieved by case 1, indicating that r(1) (reference packet A) is matched to t(1) (traffic packet 0). Thus, the best possible choice after evaluating the first two reference packets and the first two traffic packets is to assign a match between packet A and packet 0, and a match between packet B and packet 1. The path value at any point (i,j) in the array can similarly be used to determine how the achievable cumulative score CF(i,j) is achieved.

The loops 310-370 and 320-360 are similarly executed for each combination of reference packet and traffic packet, to determine an achievable cumulative score for each point in the array, and to identify a path (relative to the last-successive point) to achieve this score. The resultant cumulative scores for the example correspondence factors of FIG. 2C, and penalties of (−50, 0), are illustrated in FIG. 2D.

The cumulative score at the lower-right of the CF array of FIG. 2D, "530", is the highest cumulative correspondence score that is achievable via a matching of the reference packets of FIG. 2A to the traffic packets of FIG. 2B, given the correspondence factors between the reference and traffic packets of FIG. 2C, a missing-traffic penalty of −50, and an extra-traffic penalty of 0. Optionally, at 380, if trailing extra-traffic packets are not to be penalized (independent of an extra-traffic penalty for initial and intervening extra-traffic packets), the maximum achievable value can be found along the lower row of the array of FIG. 2D; and if trailing missing-traffic packets are not to be penalized (independent of the initial and intermediate missing-traffic packets), the maximum achievable value can be found along the last column of the array of FIG. 2D. Such techniques are common to applications of the Needleman-Wunsch algorithm.

To determine the assignment of matches and/or null-matches corresponding to this highest achievable score, the path array is traced back from the highest score, at 390.

FIG. 4A illustrates the lower-right portion of the path array corresponding to the reference packets D-F, and traffic packets 10-14. Although this path array was created explicitly at 350 during the determination of the best case, it can also be deduced from the cumulative scores of FIG. 2D and the correspondence factors of FIG. 2C, by determine how each current cell (i,j) could have been reached. Wherever diagonally-adjacent cells of the array (i−1,j−1) and (i,j) differ by the correspondence factor cf(i,j), the path to (i,j) would have been case 1, the matching of reference r(i) to t(j). Wherever vertically-adjacent cells (i−1,j) and (i,j) differ by the penalty of a missing traffic packet (in this example, −50), the path to (i,j) would have been case 2. Wherever horizontally-adjacent cells (i,j−11) and (i,j) differ by the penalty of an extra traffic packet (in this example, 0), the path to (i,j) would have been case 3. In the event of a "tie", i.e. cell (i,j) being reached by more than one case, either case can be selected as the path, as both cases provide the same cumulative score. In an alternative embodiment, this dynamic determination of the path to each cell (i,j) based on a comparison with its adjacent neighbors can be used in lieu of the creation of an explicit path array during the determination of the highest achievable score.

FIG. 4B illustrates the same lower-right portion of the path array, except that arrows are used to identify the implication of the value of the path at each cell (i,j). At the lower right cell (6,15) ("F","14"), the path to this cell is case 3, indicating that traffic packet 14 is an "extra traffic packet", i.e. a traffic packet that is not matched to any reference packet. The implication of this path value is that the cell was reached from cell (6,14)

("F", "13"), the cell to the left of cell (6,15). Each cell in FIG. 4B corresponding to a case 3 in FIG. 4A is represented by a left arrow, indicating that the path back from this cell is to the left.

Cell (6,14) ("F","13") in FIG. 4A indicates that the path to this cell was case 1, a match between r(6) and t(14), indicating that, to achieve the highest score, the assignment includes a matching of reference packet "F" to traffic packet "13". To reach this cell (6,14) via case 1, the prior cell must have been (5,13), and thus an up-and-to-the-left diagonal arrow is used to represent each case-1 path cell in FIG. 4B. In like manner, an up-arrow is used to represent each case-2 path cell in FIG. 4B.

The resultant back-tracked path from the lower-right cell is indicated by the path of "bold" entries in FIGS. 4A and 4B, and similarly in FIG. 2D. In FIG. 2D, each diagonal transition along the back-tracked path indicates an assigned match, thereby indicating the assignment of (A-2, B-5, C-6, D-9, E-11, F-13) that provides a cumulative correspondence factor of 530, as illustrated in FIG. 2E.

One of ordinary skill in the art will recognize that the algorithm of FIG. 3 represents one example technique for finding an optimal set of matches between reference and traffic packets that avoids having to exhaustively evaluate every possible combination of matches. Other algorithms common in the art of dynamic programming may also be adapted to provide efficient determinations of optimal matchings in view of this disclosure. Similarly, the algorithm of FIG. 3 may be further modified to improve its efficiency, given other assumptions or constraints. For example, as noted above, if it is assumed and/or determined that matching initial reference packets to trailing traffic packets will accumulate a substantial missing-traffic penalty, the upper-right section of the CF array need not be evaluated. In like manner, if it is assumed or determined that matching trailing reference packets to initial traffic packets, the lower-left section of the CF array need not be evaluated. Evaluations in the upper-left and lower-right sections of the CF array can further be avoided based on accumulated extra-traffic penalties, and/or a combination of both types of penalties.

In an example embodiment, a maximum missing-traffic penalty limit is set, such that, regardless of the achievable accumulated score, an assignment that introduces a missing-traffic penalty above the limit is considered non-viable. If there are R reference packets and T traffic packets, and a penalty of P associated with each missing-traffic case, and a maximum penalty limit of M, then, at most k=M/P missing-traffic cases will be tolerated. Therefore, the cells below each cell(i,j), where (i−j) is equal to k, need not be evaluated, because to reach such cells, more than k missing-traffic cases will be required. In like manner, cells to the right of each cell(i,j), where (R−i)−(T−j) is equal to k, need not be evaluated, because progressing from such cells will require more than k missing-traffic cases. These rules can be incorporated between blocks 320 and 331 in FIG. 3, such that the processing of the cells at 331-350 is avoided. The initialization at 301 is also modified to initialize the cumulative score CF(i,j) for these cells, or for all cells, to a suitably low value such that any subsequent access to these un-processed cells at 331-333 does not result in a "best case" choice at 340. As noted above, similar techniques can be used to reduce the processing of the cells in the CF array based on the extra-traffic penalty and/or a combination of penalties.

In addition to the above "static" elimination of cells to be evaluated, cells can be eliminated from evaluation dynamically, as the array is being filled. In the above example of a maximum missing-traffic limit, each cell that introduces a missing-traffic case reduces the remaining maximum number of missing-traffic cases by one. If a count is maintained of the number of missing-traffic cases leading to each cell(i,j), then any cell that cannot be reached without exceeding the limit need not be evaluated. That is, for example, if the penalty count of cells (i−1,j−1) and (i,j−1) exceed the missing-traffic limit, and the penalty count of cell(i−1,j) equals the missing-traffic limit, then there is no path to the cell(i,j) that will not exceed the limit. Thus, the penalty count of cell(i,j) is set to a value that exceeds the limit, and the determination of the cumulative score (331-350) for this cell(i,j) is bypassed, being replaced by setting the cumulative score CF(i,j) to a suitably low value, to preclude subsequent accesses to this score from being selected as a best choice in 331-340, as noted above. Similar dynamic rules can be defined based on the extra-traffic penalty and/or a combination of penalties.

Additional rules to avoid the processing of cells in the CF array may also be developed, depending upon the particular assigned penalties. For example, if the missing-packet and extra-packet penalties are the same, and a limit to the total accumulated penalty is defined, it can be shown that if a cell(i,j) is unreachable without exceeding the limit, all of the cells diagonally below the unreachable cell (cells(i+x,j+x), x>=1) are also unreachable without exceeding the limit.

Figure 5:
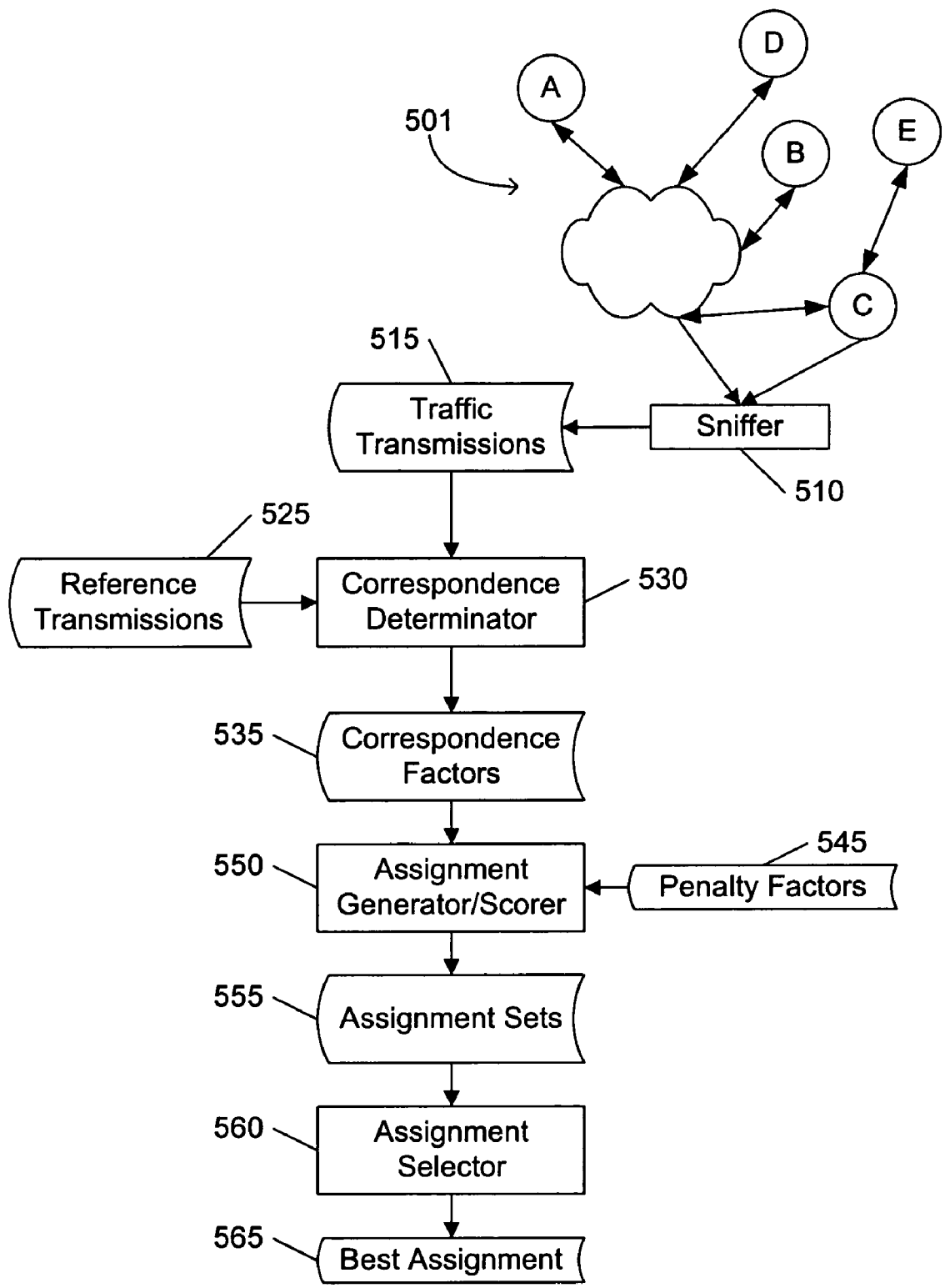
FIG. 5 illustrates an example system for finding matching packets within a set of traffic packets in accordance with this invention.

FIG. 5 illustrates an example block diagram of a system for finding matching transmissions within a set of traffic transmissions in accordance with this invention.

A network 501 is illustrated as providing traffic transmissions 515 for consideration, via a network "sniffer" 510, although any of a variety of other environments and/or techniques can also be used to collect traffic transmissions 515. As noted above, the traffic transmissions 515 may be a copy of the actual transmissions from the network 501, but are often a description of the actual transmissions, a portion of the actual transmissions, such as the header information from each transmission, or a combination thereof.

A correspondence determinator 530 is configured to compare the traffic transmissions 515 to a set of reference transmissions 525. As with the traffic transmissions 515, the reference transmissions 525 may be a copy of actual transmissions, a description of actual transmissions, a portion of actual transmissions, such as the header information from each transmission, or combinations of each. Additionally, the reference transmissions 525 may include a template with variable parameters, an algorithmic description of expected transmissions corresponding to a given transaction, and so on. The only requirement of the reference transmissions 525 is that they contain information that the correspondence determinator 530 can use to determine a measure of the correspondence between a given traffic transmission 515 and a given reference transmission 525.

The correspondence determinator 530 is configured to provide a set 535 of correspondence factor cf(i,j) between each reference transmission r(i) and each traffic transmission t(j). However, as noted above, for greater efficiency, the correspondence determinator 530 may be configured to avoid the determination of the correspondence factor between reference and traffic transmissions that are unlikely to provide a "best" combination of matches, such as initial reference/traffic transmissions and trailing traffic/reference transmissions, and so on.

Preferably, the correspondence determinator 530 includes a hierarchy of comparators that serve to distinguish among different types or classes of transmissions, to facilitate an efficient determination/estimation of the correspondence between transmissions. For example, at a first level of correspondence-determination, the direction of the transmission can be used to assign a very low correspondence factor to transmissions having different directions (the "−99" entries of FIG. 2C). Once such a determination of the correspondence factor is made, no further comparisons are necessary. Other information associated with the transmissions, typically contained in the "header" information of each transmission, can similarly be used to quickly eliminate pairs of transmissions from further correspondence-determination analysis.

At a next level of correspondence-determination, the size of each transmission may be used to determine a correspondence factor between the transmissions. Transmissions of substantially different sizes, for example, may be assigned a low correspondence factor, although not as low as transmissions in opposing directions.

At a lower, typically lowest, level of correspondence-determination, the content of the transmissions may be compared. As noted above, such a content-based comparison may be based on finding particular key words or phrases in the traffic transmissions, or it may be based on finding matching sequences of bytes/words within the traffic and reference transmissions. In the example of finding key words or phrases, subsets of the reference transmissions 525 may be globally characterized as being likely to contain a given set of words or phrases, and the search for these words or phrases in the traffic transmissions would typically be based on this characterization, rather than on the specific content of each reference transmission 525. In the example of finding matching sequences, the traffic transmission 515 is searched for content that specifically matches content of the reference transmission 525.

In a preferred embodiment, the above described Needleman-Wunsch algorithm can be used to compare the contents of a traffic transmission 515 to a reference transmission 525, with, for example, a correspondence factor of +1 for matching bytes, −1 for non-matching bytes, and a penalty of 0 for missing or extra bytes. The correspondence factor between the transmissions would then be dependent upon the resultant cumulative correspondence score of this byte-by-byte comparison of the content of the transmissions. In an alternative embodiment, the Needleman-Wunsch algorithm, or other pattern-matching algorithm, is used to determine the best match of bytes within the transmissions, and the correspondence factor between the transmissions is based on the longest continuous sequence of matching bytes (i.e. without a missing or extra byte 'gap') within the best match of bytes.

An assignment generator/scorer 550 is configured to create sets 555 of possible assignments/matchings of reference-to-traffic transmissions, and to assign a score to each set of assignments, based on the correspondence factors 535 for each matching reference and traffic transmission, and penalty factors 545 for each non-match. Theoretically, the generator 550 will generate all possible combinations of matches and non-matches between the reference and traffic transmissions. However, as discussed above, because the sequence-order of the reference transmissions 525 has significant relevance, the generator 550 is preferably configured to limit the sets of possible combinations to those that substantially preserve the sequence-order of the reference transmissions in the order of the traffic transmissions that are matched to these reference transmissions. Preferably, a dynamic programming technique, such as the above described variation to the Needleman-Wunsch algorithm, is used in the generator 550 to further limit the number of sets 555 of possible assignments to those that produce higher intermediate cumulative scores, as also discussed above.

An assignment selector 560 selects the highest scoring assignment set from the sets of assignments 555, to identify the best assignment set 565. As noted above, the best assignment set in this example embodiment is the assignment of matches (and non-matches) of traffic transmissions to each of the reference transmissions that provides a highest cumulative score while substantially maintaining the sequence order of the reference transmissions, based on a correspondence factor associated with each match, and a penalty factor associated with each non-match.

The foregoing merely illustrates the principles of the invention. It will thus be appreciated that those skilled in the art will be able to devise various arrangements which, although not explicitly described or shown herein, embody the principles of the invention and are thus within its spirit and scope. For example, one of ordinary will recognize that a strict ordering of the traffic packets corresponding to the reference packets need not be enforced. In an alternative embodiment, all of the possible assignments of reference packets to traffic packets may be considered, to allow for packets arriving out-of-order, and a combined score could include a 'penalty' for each out-of-order assignment. In such an embodiment, for example, the penalty would be based on the magnitude of the out-of-order assignment, as measured by a time of arrival of each packet. Such an alternative would not be directly compatible with the above described variation of the Needleman-Wunsch algorithm, but would be compatible with an exhaustive or semi-exhaustive determination of the cumulative score for such out-of-order assignments, and subsequent selection of the highest scoring set of matches. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements.

We claim:
1. A method comprising:
identifying, by a traffic analysis system, a plurality of predefined reference transmissions,
determining, by the traffic analysis system, correspondence factors between traffic transmissions of a plurality of traffic transmissions and reference transmissions of the plurality of reference transmissions to provide a plurality of correspondence factors for each of the ref- erence transmissions, each correspondence factor being a measure of correspondence between a traffic transmission and a reference transmission, and selecting, by the traffic analysis system, a set of matching transmissions to the reference transmissions from the plurality of traffic transmissions, based on the plurality of correspondence factors, and based on a sequence order of the plurality of reference transmissions.

2. The method of claim 1, wherein selecting the set of matching transmissions is further based on a first penalty factor associated with each failure to match one of the reference transmissions to one of the traffic transmissions.

3. The method of claim 2, wherein selecting the set of matching transmissions is further based on a second penalty factor associated with each failure to match one of the traffic transmissions to one of the reference transmissions.

4. The method of claim 1, wherein selecting the set of matching transmissions is further based on a penalty factor associated with each failure to match one of the traffic transmissions to one of the reference transmissions.

5. The method of claim 1, wherein selecting the set of matching transmissions includes applying a Needleman-Wunsch algorithm to the pluralities of reference and traffic transmissions.

6. The method of claim 1, wherein selecting the set of matching transmissions includes determining an assignment score that is based on:

the correspondence factor of each matching transmission and corresponding reference transmission, and a first penalty factor that is associated with each reference transmission that is not matched to a corresponding traffic transmission.

7. The method of claim 6, wherein determining the assignment score is further based on a second penalty factor that is associated with each traffic transmission that is not matched to a corresponding reference transmission.

8. The method of claim 7, wherein the first penalty factor is substantially equal to the second penalty factor.

9. The method of claim 6, wherein selecting the set of matching transmissions includes:

determining a plurality of assignment scores for a plurality of possible assignments of matching transmissions and reference transmissions, identifying a maximum assignment score within the plurality of assignment scores, and selecting the set of matching transmissions corresponding to an assignment of the plurality of possible assignments having the maximum assignment score.

10. The method of claim 9, further including determining the plurality of possible assignments.

11. The method of claim 10, wherein determining the plurality of possible assignments is based on a maximum penalty score within the assignment score.

12. The method of claim 11, wherein the maximum penalty score includes an accumulation of the first penalty factor for each reference transmission that is not matched to one of the traffic transmissions.

13. The method of claim 12, further including maintaining a running accumulation of the first penalty factor for each reference transmission that is not matched to one of the traffic transmissions while determining each possible assignment of the plurality of possible assignments, and wherein determining each possible assignment is based on the running accumulation.

14. The method of claim 6, wherein the assignment score is based on a sum of:

the correspondence factor for each production transmission having a matching transmission, and the first penalty factor for each production transmissions having no matching traffic transmission.

15. The method of claim 14, wherein the sum further includes a second penalty factor for each traffic transmission having no matching reference transmission.

16. The method of claim 1, wherein the reference transmissions and traffic transmissions conform to a packet-based protocol, such that each reference transmission corresponds to a reference packet and each traffic transmission corresponds to a traffic packet.

17. The method of claim 16, wherein selecting the set of matching transmissions includes determining an assignment score that is based on:

the correspondence factor of each matching packet and corresponding reference packet, and a first penalty factor that is associated with each reference packet that is not matched to a corresponding traffic packet.

18. The method of claim 17, wherein selecting the set of matching transmissions includes:

determining a plurality of assignment scores for a plurality of possible assignments of corresponding traffic packets and reference packets, identifying a maximum assignment score within the plurality of assignment scores, and selecting the set of matching packets corresponding to an assignment of the plurality of possible assignments having the maximum assignment score.

19. The method of claim 18, further including determining the plurality of possible assignments.

20. The method of claim 19, wherein determining the plurality of possible assignments is based on a maximum penalty score within the assignment score.

21. The method of claim 20, further including maintaining a running accumulation of penalties for each non-match of a reference packet and a traffic packet while determining each possible assignment, and wherein determining the possible assignment is based on the running accumulation.

22. The method of claim 20, wherein the maximum penalty score includes an accumulation of the first penalty factor for each reference packet that is not matched to one of the traffic packets.

23. The method of claim 22, further including maintaining a running accumulation of the first penalty factor for each reference packet that is not matched to one of the traffic packets, and determining the plurality of possible assignments is based on the running accumulation.

24. The method of claim 18, wherein the assignment score is based on a sum of:

the correspondence factor for each production packet having a corresponding matching traffic packet, and the first penalty factor for each production packet having no matching traffic packet.

25. The method of claim 24, wherein the sum includes a second penalty factor for each traffic packet having no matching reference packet.

26. The method of claim 1, wherein the correspondence factor is based on one or more of:

a direction of the traffic transmission, a size of the traffic transmission, and content of the traffic transmission.

27. The method of claim 1, wherein determining the correspondence factor includes identifying strings within the traffic transmission that correspond to strings within the reference transmission.

28. The method of claim 27, wherein determining the correspondence factor is based on a maximum continuous length of the strings within the traffic transmission that correspond to strings within the reference transmission.

29. The method of claim 27, wherein identifying the strings within the traffic transmission that correspond to strings within the reference transmission includes application of a Needleman-Wunsch algorithm.

30. The method of claim 1, wherein determining the correspondence factor includes identifying occurrences of key words or phrases within some or all of the traffic transmissions.

31. A system comprising hardware and software components that includes:
a correspondence determinator that is configured to determine correspondence factors between a plurality of reference transmissions and a plurality of traffic transmissions to provide a plurality of correspondence factors for each of the plurality of reference transmissions, each correspondence factor being a measure of correspondence between a traffic transmission and a reference transmission,
an assignment generator that is configured to generate a plurality of possible assignments of matching traffic transmissions to the plurality of reference transmissions from the plurality of reference transmissions, and
an assignment selector that is configured to select a preferred assignment from the plurality of possible assignments, based on a score associated with each assignment of the plurality of possible assignments that is based on the plurality of correspondence factors.

32. The system of claim 31, wherein the correspondence determinator is configured to determine the correspondence factors based on one or more of:
a direction of each traffic transmission relative to a direction of each reference transmission,
a size of each traffic transmission relative to a size of each reference transmission, and
content of each traffic transmission relative to content of each reference transmission.

33. The system of claim 31, wherein the correspondence determinator is configured to determine one or more of the correspondence factors based on occurrences of key words or phrases in one or more of the traffic transmissions.

34. The system of claim 31, wherein the correspondence determinator is configured to determine one or more of the correspondence factors based on occurrences of strings within the traffic transmissions that correspond to strings within the reference transmissions.

35. The system of claim 34, wherein the correspondence factors are based on a maximum length of the strings within the traffic transmissions that correspond to strings within the reference transmissions.

36. The system of claim 34, wherein the correspondence determinator is configured to apply a Needleman-Wunsch algorithm to determine the one or more of the correspondence factors.

37. The system of claim 31, wherein the assignment generator is configured to generate the possible assignments such that each assignment substantially maintains a sequence order associated with the reference transmissions.

38. The system of claim 37, wherein the assignment generator is configured to determine the score of each assignment.

39. The system of claim 38, wherein the score is also dependent upon a penalty factor that is associated with each traffic transmission that is not matched to one of the reference transmissions.

40. The system of claim 38, wherein the score is also dependent upon a first penalty factor that is associated with each reference transmission that is not matched to one of the traffic transmissions.

41. The system of claim 40, wherein the score is also dependent upon a second penalty factor that is associated with each traffic transmission that is not matched to one of the reference transmissions.

42. The system of claim 41, wherein the assignment generator applies a Needleman-Wunsch algorithm to generate and score each possible assignment.

43. The system of claim 38, wherein the assignment generator is configured to generate each possible assignment based on a maximum allowable accumulation of penalties associated with non-matched pairs of reference and traffic transmissions.

44. The system of claim 43, wherein the assignment generator is configured to:
maintain a running accumulation of the penalties while each possible assignment is being generated, and
avoiding the generation of one or more other possible assignments based on the running accumulation relative to the maximum allowable accumulation.

45. The system of claim 44, wherein the running accumulation is based on an accumulation of penalties associated with reference transmissions that are not matched to one of the traffic transmissions.

46. The system of claim 43, wherein the maximum allowable accumulation is based on an accumulation of penalties associated with reference transmissions that are not matched to one of the traffic transmissions.

47. The system of claim 31, wherein the reference transmissions and traffic transmissions conform to a packet-based protocol.

48. A system comprising hardware and software components that includes:
a correspondence determinator that is configured to determine correspondence factors between a plurality of reference packets and a plurality of traffic packets to provide a plurality of correspondence factors for each of the plurality of reference packets, each correspondence factor being a measure of correspondence between a traffic transmission and a reference transmission,
an assignment generator that is configured to generate a plurality of assignments that each provide a mapping between the plurality of reference packets and the plurality of traffic packets, based on the plurality of correspondence factors and based on a sequence order of the plurality of reference packets, and
an assignment selector that is configured to select a preferred assignment from the plurality of assignments, based on a score that is associated with each assignment of the plurality of assignments.

49. The system of claim 48, wherein each correspondence factor is based on one or more of:
a direction of each traffic packet relative to a direction of a corresponding reference packet,
a size of each traffic packet relative to a size of a corresponding reference packet, and content of each traffic packet relative to content of a corresponding reference packet.

50. The system of claim 49, wherein each assignment includes one or more matching pairs of reference and traffic packets, and the assignment generator is configured to determine the score of each assignment, based on the correspondence factor of each matching pair of reference and traffic packets, and based on a first penalty factor associated with each reference packet that is not paired to a matching traffic packet.

51. The system of claim 50, wherein the score of each assignment is further based on a second penalty factor associated with each traffic packet that is not paired to a matching reference packet.

52. The system of claim 51, wherein the assignment generator is configured to apply a Needleman-Wunsch algorithm to generate and score the plurality of assignments.

* * * * *